United States Patent
Ernst et al.

(10) Patent No.: US 7,421,512 B2
(45) Date of Patent: Sep. 2, 2008

(54) COMMUNICATION SYSTEM AND METHOD THEREFOR

(75) Inventors: Thierry Ernst, Gif-sur-Yvette (FR); Hong-Yon Lach, Gif-sur-Yvette (FR)

(73) Assignee: Motorola, Inc., Schaumburg, IL (US)

(*) Notice: Subject to any disclaimer, the term of this patent is extended or adjusted under 35 U.S.C. 154(b) by 955 days.

(21) Appl. No.: 10/276,667

(22) PCT Filed: May 21, 2001

(86) PCT No.: PCT/EP01/05799

§ 371 (c)(1), (2), (4) Date: Jun. 30, 2003

(87) PCT Pub. No.: WO01/91408

PCT Pub. Date: Nov. 29, 2001

(65) Prior Publication Data

US 2004/0010615 A1    Jan. 15, 2004

(30) Foreign Application Priority Data

May 24, 2000   (EP)   ................... 00401441

(51) Int. Cl.
*G06F 15/173* (2006.01)

(52) U.S. Cl. .............. 709/238; 709/205; 455/432.1; 455/436; 370/331

(58) Field of Classification Search ........... 709/238, 709/205; 455/435.1, 436, 432.1; 370/331
See application file for complete search history.

(56) References Cited

U.S. PATENT DOCUMENTS

| | | | | |
|---|---|---|---|---|
| 6,421,714 B1* | 7/2002 | Rai et al. | ................... | 709/217 |
| 6,621,810 B1* | 9/2003 | Leung | ................... | 370/338 |
| 6,775,225 B2* | 8/2004 | Nakade et al. | ........... | 369/271.1 |
| 6,816,912 B1* | 11/2004 | Borella et al. | ............... | 709/238 |
| 6,937,590 B2* | 8/2005 | Lee | ............. | 370/338 |
| 6,947,401 B2* | 9/2005 | El-Malki et al. | ............ | 370/331 |
| 6,973,057 B1* | 12/2005 | Forslow | ..................... | 370/328 |

(Continued)

FOREIGN PATENT DOCUMENTS

EP    0 883 266 A    12/1998

(Continued)

OTHER PUBLICATIONS

IP Multicast for Mobile Hosts, George Xylomenos and George C. Polyzos, University of California, San Diego, IEEE Communication Magazine, Jan. 1997.*

(Continued)

*Primary Examiner*—Nathan J. Flynn
*Assistant Examiner*—Mohammad Siddiqi

(57) ABSTRACT

Known protocols for supporting mobility in relation to Internet Protocol (IP) networks are not able to efficiently support distribution of Binding Update messages to Correspondent Nodes (104) in a set of fixed IP networks (102). Consequently, the present invention makes use of a multi-cast service provided by the IPv6 protocol in order to deliver Binding Update messages to the Correspondent Nodes (104). The use of the multi-cast service to deliver Binding Update messages avoids a proliferation of such messages which would occur under know protocols requiring a mobile node (106,107) to send the Binding Update message to each Correspondent Node (104). Consequently, use of bandwith in the set of fixed IP networks (102) is more efficient.

10 Claims, 4 Drawing Sheets

U.S. PATENT DOCUMENTS

| | | |
|---|---|---|
| 7,120,453 B2 * | 10/2006 | La Porta et al. ............. 455/458 |
| 7,161,897 B1 * | 1/2007 | Davies et al. ............... 370/217 |
| 2002/0102999 A1 * | 8/2002 | Maggenti et al. ........... 455/518 |

FOREIGN PATENT DOCUMENTS

| | | |
|---|---|---|
| EP | 0883266 A2 | 12/1998 |
| EP | 1 032 178 A | 8/2000 |
| WO | WO 99 56445 A | 11/1999 |
| WO | WO 00/54475 | 9/2000 |
| WO | WO 0054475 A | 9/2000 |

OTHER PUBLICATIONS

Ryu B, et al.: "Managing IP Services Over a PACS Packet Network", IEEE Network: The Magazine of Computer Communications, IEEE Inc. New York, USA, vol. 12, No. 4, Jul. 4, 1998, pp. 4-10, XP000875300, ISSN: 0890-8044.

Ryu, B., Wei, J., Zhang, Y., and Dao, S., HRL Laboratories, "Managing IP Services Over a PACS Packet Network", IEEE, Jul./Aug. 1998.

* cited by examiner

COMMUNICATION SYSTEM AND METHOD THEREFOR

FIELD OF THE INVENTION

The present invention relates, in general, to a communication system of the type comprising a first network and a mobile node, the mobile node being mobile relative to the first network. The present invention also relates to a method of switching between a first access point and a second access point of the first network, and is particularly but not exclusively applicable to an Internet environment.

BACKGROUND OF THE INVENTION

The Internet comprises a large number of interconnected communications networks. In topological terms, the Internet comprises a large number of nodes which can communicate with each other. It is sometimes desirable for a Mobile Node to connect to the Internet to communicate with nodes in the Internet. A node with which the Mobile Node communicates is known as a Correspondent Node (CN). In practice, the Mobile Node has a number of Correspondent Nodes. The Mobile Node can be located in any number of modes of transport, for example: a train, a boat, an aircraft, a car. Alternatively, the Mobile Node may correspond to a moving human being, for example, a Personal Area Network.

As implied by the word "mobile", the Mobile Node is not limited to a single topological point of attachment to the Internet. Instead, the Mobile Node can move between and connect to a number of topological points of attachment to the Internet. The Mobile Node is identified by a Home Address, the Home Address corresponding to an Internet Protocol (IP) address on a Home Link. The Home Link is a communications link with a router known as a Home Agent, the Home Link corresponding to an initial topological point of attachment to the Internet; a link with a router located at a topological point of attachment other than the initial topological point of attachment is known as a Foreign Link.

When the Mobile Node migrates from the initial topological point of attachment to the Internet to the Foreign Link, one of a number of routers on the Foreign Link assigns a Careof Address to the Mobile Node. The Careof Address is an IP address identifying the current topological point of attachment of the Mobile Node to the Internet.

Subsequent movements of the Mobile Node to other Foreign Links results in the allocation of respective new Careof Addresses. The Careof Address is registered with the Home Agent. In order to maintain continuous connectivity between a Correspondent Node and the Mobile Node, mobility management is required.

The Mobile-IPv4, the Mobile-IPv4 with route optimisation and the Mobile-IPv6 protocols devised by the Mobile-IP working group of the Internet Engineering Task Force (IETF) are designed to manage the mobility of the Mobile Node.

In order to optimise routing paths between the Correspondent Nodes and the Mobile Node, it is necessary to provide the Correspondent Nodes of the Mobile Node with the Careof Address of the Mobile Node.

Under the Mobile-IPv4 protocol, Correspondent Nodes are not aware of the Careof Address of the Mobile Node. Consequently, all traffic destined for the Mobile Node is routed via the Home Agent, the Home Agent redirecting the traffic destined for the Mobile Node to the current topological point of attachment of the Mobile Node to the foreign network using the Careof Address corresponding to the IP address of the router on the Foreign Link, known as a Foreign Agent, in the Mobile-IPv4 protocol. Under the Mobile-IPv4 protocol with route optimisation, the Careof Address of the Mobile Node is sent by the Home Agent to all the Correspondent Nodes of the Mobile Node, thereby ensuring that all traffic destined for the Mobile Node is sent by an optimal path between the Correspondent Nodes and the Mobile Node.

Instead of the Home Agent communicating the Careof Address to the Correspondent Nodes of the Mobile Node, the Mobile-IPv6 protocol requires the Careof Address of the Mobile Node to be sent by the Mobile Node itself to the Correspondent Nodes of the Mobile Node, again thereby ensuring that all traffic destined for the Mobile Node is sent by the optimal path between the Correspondent Nodes and the Mobile Node.

In the cases of Mobile-IPv4 with route optimisation and Mobile-IPv6, the Careof Address is communicated to the Correspondent Nodes of the Mobile Node by means of a message known as a "Binding Update" (BU). Under the Mobile-IPv4 with route optimisation and the Mobile-IPv6 protocols, BUs need to be periodically sent to each Correspondent Node of the Mobile Node.

The Mobile-IPv4 protocol is clearly inefficient in terms of routing, due to the triangular nature of the route taken by any data destined for the Mobile Node when the Mobile Node is connected to a Foreign Link. The Mobile-IPv4 protocol with route optimisation and the Mobile-IPv6 protocol, whilst being reasonably efficient in routing terms, begin to be inefficient in terms of signalling costs and bandwidth use when the number of Correspondent Nodes of the Mobile Node becomes large. As the number of Correspondent Nodes increases, the number of BUs correspondingly increases. Hence, for a large number of Correspondent Nodes of the Mobile Node, a risk exists of overloading the Internet with signalling messages, i.e. a Binding Update "explosion".

Additionally, the above described protocols do not either: specifically support large mobile networks, or do not specifically support mobile networks at all. A mobile network is a number of interconnected nodes which move together relative to a fixed network, for example, the Internet. The Mobile-IPv4 with route optimisation and Mobile-IPv6 protocols do not mention support for mobile networks.

A way of using the above protocols to support mobile networks is to perceive the mobile network as a mobile router coupled to a number of nodes. Since the mobile router is an example of the Mobile Node, the mobile router can obtain a Careof Address for registration with the Home Agent. However, as the mobile network can contain hundreds of nodes, each having several Correspondent Nodes, the number of BUs which need to be transmitted is considerable and increases with growth of the mobile network. If the number of nodes forming the mobile network becomes too large, the number of BUs sent may again overload the network with signalling messages.

Also in the context of mobile networks, it is not clear from the Mobile-IPv4 protocol with route optimisation and the Mobile-IPv6 protocol whether the BUs are transmitted by the nodes forming the mobile network or the mobile router, further evidencing the fact that the above protocols have not been designed to support mobile networks. Transmission of BUs by the nodes forming the mobile network requires additional mechanisms to distribute the Careof Address obtained by the mobile router coupled to the mobile network. Also, authentication problems arise at the Correspondent Nodes when the BUs are transmitted by the mobile router.

In summary, the Mobile-IPv4 protocol is inefficient in terms of bandwidth use, because data is not routed by an optimal path between the Correspondent Node and the Mobile Node. Mobile-IPv4 with route optimisation and Mobile-IPv6 do support optimal routing by providing the IP address identifying the current topological point of attachment of the Mobile Node to the Internet, but do not cope well when the number of Correspondent Nodes is large and/or the Mobile Node corresponds to a mobile network formed by a large number of nodes.

The present invention to obviates, or at least mitigates, the disadvantages associated with supporting Mobile Nodes and mobile networks in an IP environment.

SUMMARY OF THE INVENTION

According to the present invention, there is provided a communications system comprising: a mobile node capable of mobility relative to a first network having a plurality of correspondent nodes, a first interfacing node and a second interfacing node, the plurality of correspondent nodes being capable of sending data to the mobile node via the first interfacing node, the mobile node being capable of moving from a first location associated with the first interfacing node of the first network to a second location associated with the second interfacing node of the first network, wherein a number of the plurality of correspondent nodes form a multicast group supported by a multicast service, the multicast service being arranged to receive updating data corresponding to a topological point of coupling of the mobile node to the first network and transmit the updating data to the number of the plurality of correspondent nodes forming the multicast group in response to a movement of the mobile node from the first location to the second location.

Preferably, the multicast service establishes a communications tree between the mobile node and the number of the plurality of correspondent nodes in the multi-cast group, a single copy of the updating data being sent on any branch of the communications tree.

Preferably, the multicast service establishes a communications tree between a node in the first network and the number of the plurality of correspondent nodes in the multi-cast group, a single copy of the updating data being sent on any branch of the communications tree. More preferably, a communication system as claimed in Claim 3, wherein the node in the first network is the first interfacing node.

Preferably, the mobile node is a mobile interfacing node coupled to a plurality of mobile network nodes to form a mobile network capable of mobility relative to the first network, the plurality of correspondent nodes being capable of communicating data with at least one of the plurality of mobile network nodes via the mobile interfacing node and the first interfacing node of the first network.

More preferably, the plurality of correspondent nodes is capable of communicating data with the at least one of the plurality of mobile network nodes via the mobile interfacing node and the second interfacing node instead of the first interfacing node of the first network in response to the mobile network moving from the first location to the second location.

Preferably, at least one of the plurality of correspondent nodes is arranged to transmit data bearing a destination IP address corresponding to a network prefix of the mobile interfacing node contained in the updating data to the mobile interfacing node.

Preferably, the at least one of the plurality of correspondent nodes is arranged to send data containing the destination address bearing the network prefix of the mobile network towards the second interfacing node.

Preferably, the updating data comprises a forwarding address for data. More preferably, the forwarding address is a Careof Address. Preferably, a system as claimed in Claim 9, wherein the forwarding address is sent in the form of a Binding Update.

Preferably, the first interfacing node is arranged to receive the updating data and redirect data destined for any one of the plurality of mobile network nodes to the second interfacing node in response to the updating data.

Preferably, the first network comprises a Domain Name Server (DNS) arranged to store an address of at least one of the mobile network nodes and an address of the multicast group corresponding to the at least one of the plurality of mobile network nodes.

Preferably, the mobile interfacing node is arranged to acquire a permanent multicast address.

Preferably, the mobile interfacing node is arranged to register the permanent multicast address with the DNS.

Preferably, the first network comprises a Domain Name Server (DNS) arranged to store an address of at least one of the mobile network nodes and an address of the multicast group corresponding to the at least one of the plurality of mobile network nodes.

Preferably, the mobile interfacing node is arranged to acquire a permanent multicast address.

Preferably, the mobile interfacing node is arranged to register the permanent multicast address with the DNS.

Preferably, substantially all of the plurality of mobile network nodes have a substantially identical network prefix.

According to a second aspect of the present invention, there is provided a method of switching between a first access point and a second access point of a first network, the first network having a first interfacing node, a second interfacing node and a plurality of correspondent nodes capable of communicating with a mobile node, the method comprising the steps of: registering the mobile node with the first interfacing node of the first network when residing at a first location; registering the mobile node with the second interfacing node of the first network associated with a second location in response to the first network moving from the first location to the second location; transmitting updating data to a multicast service, and transmitting the updating data to a number of the plurality of correspondent nodes subscribing to the multicast service.

Preferably, the mobile node is a mobile interfacing node coupled to a plurality of mobile network nodes to form a mobile network capable of mobility relative to the first network, the plurality of correspondent nodes being capable of communicating data with at least one of the plurality of mobile network nodes via the mobile interfacing node and the first interfacing node of the first network.

More preferably, the plurality of correspondent nodes is capable of communicating data with the at least one of the plurality of mobile network nodes via the mobile interfacing node and the second interfacing node instead of the first interfacing node of the first network in response to the mobile network moving from the first location to the second location.

Preferably, the multicast service establishes a communications tree between the mobile node and the number of the plurality of correspondent nodes in the multi-cast group, a single copy of the updating data being sent on any branch of the communications tree.

Preferably, at least one of the plurality of correspondent nodes is arranged to transmit data bearing a destination IP address corresponding to a network prefix of the mobile interfacing node contained in the updating data to the mobile interfacing node.

Preferably, the at least one of the plurality of correspondent nodes is arranged to send data containing the destination address bearing the network prefix of the mobile network towards the second interfacing node.

Preferably, the updating data comprises a forwarding address for data. More preferably, the forwarding address is a Careof Address.

Preferably, the forwarding address is sent in the form of a Binding Update.

According to a third aspect of the present invention, there is provided a mobile node apparatus for coupling to a first network at a first topological point of coupling corresponding to a first location and routing communications from a correspondent node in the first network via a first interfacing node of the first network, the apparatus comprising: a processor unit coupled to a storage unit and a transceiver unit for communicating with the first interfacing node of the first network at a first location; the processor unit being adapted to transmit updating data to a multicast service of the first network in response to movement of the mobile node from the first location to a second topological point of coupling corresponding to a second location.

Preferably, the mobile node is a mobile interfacing node coupled to a plurality of mobile network nodes to form a mobile network capable of mobility relative to the first network, the correspondent node being capable of communicating data with at least one of the plurality of mobile network nodes via the interfacing node of the mobile network and the first interfacing node of the first network.

More preferably, the correspondent node is capable of communicating data with at least one of the plurality of mobile network nodes via the mobile interfacing node and a second interfacing node at the second location instead of the first interfacing node in response to the mobile network moving from the first location to the second location.

Preferably, the multicast service establishes a communications tree between the mobile node and a number of a plurality of correspondent nodes forming a multi-cast group, a single copy of the updating data being sent on any branch of the communications tree.

Preferably, the updating data comprises a forwarding address for data. More preferably, the forwarding address is a Careof Address.

Preferably, the forwarding address is sent in the form of a Binding Update.

According to a fourth aspect of the present invention, there is provided a mobile network gateway as set forth above in relation to the mobile node apparatus.

According to a fifth aspect of the present invention, there is provided a network entity apparatus for a first network comprising: a processor unit coupled to a storage unit and a transceiver unit for communicating with a mobile node, wherein the processor unit comprises a registration unit coupled to the transceiver unit and arranged to register with a multicast service so as to become a member of a multicast group, and receive updating data from the multicast service.

Preferably, the multicast service establishes a communications tree between the mobile node and a number of a plurality of correspondent nodes in the multicast group, a single copy of the updating data being sent on any branch of the communications tree.

Preferably, the registration unit receives the updating data from the multicast service in response to movement of the mobile node from a first location to a second location.

Preferably, the mobile node is a mobile interfacing node coupled to a plurality of mobile network nodes to form a mobile network capable of mobility relative to the first network, a plurality of correspondent nodes being capable of communicating data with at least one of the plurality of mobile network nodes via a first interfacing node of the first network at a first location and the mobile interfacing node.

More preferably, the plurality of correspondent nodes is capable of communicating data with the at least one of the plurality of mobile network nodes via the mobile interfacing node and a second interfacing node at a second location of the first network instead of the first interfacing node in response to the mobile network moving from the first location to the second location.

Preferably, the processor unit is arranged to transmit data bearing a destination IP address corresponding to a network prefix of the mobile interfacing node contained in the updating data to the mobile interfacing node.

Preferably, the processor unit is arranged to send data containing the destination address bearing the network prefix of the mobile network towards the second interfacing node.

Preferably, the updating data comprises a forwarding address for data. More preferably, the forwarding address is a Careof Address.

Preferably, the forwarding address is received in the form of a Binding Update.

Preferably, the processor is arranged to receive the updating data and redirect data destined for any one of the plurality of mobile network nodes in response to the updating data.

According to a sixth aspect of the present invention, there is provided a home gateway comprising the network entity apparatus as set forth above.

According to a seventh aspect of the present invention, there is provided a correspondent node comprising network entity apparatus as set forth above.

According to a eighth aspect of the present invention, there is provided a communication system comprising: a mobile interfacing node coupled to a plurality of mobile network nodes to form a mobile network capable of mobility relative to a first network, the first network having a plurality of correspondent nodes, a first interfacing node and a second interfacing node, the mobile network being capable of moving from a first location associated with the first interfacing node of the first network to a second location associated with the second interfacing node of the first network, the plurality of correspondent nodes being capable of communicating data with at least one of the plurality of mobile network nodes via the mobile interfacing node and the first interfacing node, wherein at least one of the plurality of correspondent nodes is arranged to receive updating data indicative of a current topological point of coupling of the mobile interfacing node to the first network and forward data bearing a destination address corresponding to a network prefix of the mobile interfacing node to the second interfacing node in response to the mobile network moving from the first location to the second location, the second location corresponding to the current topological point of coupling of the mobile interfacing node to the first network.

Preferably, a number of the plurality of the correspondent nodes form a multicast group supported by a multicast service, the multicast service being arranged to receive the updating data and transmit the updating data to the number of correspondent nodes forming the multicast group in response to movement of the mobile network from the first location to the second location.

Preferably, the updating data comprises a forwarding address for data. More preferably, the forwarding address is a Careof Address.

Preferably, the forwarding address is sent in the form of a Binding Update.

Preferably, the first interfacing node is arranged to receive the updating data and redirect data destined for any one of the plurality of mobile network nodes to the second interfacing node in response to the updating data.

Preferably, the first network comprises a Domain Name Server (DNS) arranged to store an address of at least one of the mobile network nodes and an address of the multicast group corresponding to the at least one of the plurality of mobile network nodes.

Preferably, the mobile interfacing node is arranged to acquire a permanent multicast address.

Preferably, the mobile interfacing node is arranged to register the permanent multicast address with the DNS.

Preferably, the first network comprises a Domain Name Server (DNS) arranged to store an address of at least one of the mobile network nodes and an address of the multicast group corresponding to the at least one of the plurality of mobile network nodes.

Preferably, substantially all of the plurality of mobile network nodes have a substantially identical network prefix.

According to a ninth aspect of the present invention, there is provided a method of switching between a first access point and a second access point of a first network, the first network having a first interfacing node, a second interfacing node and a plurality of correspondent nodes capable of communicating with at least one of a plurality of mobile network nodes via the first interfacing node and a mobile interfacing node coupled to the plurality of mobile network nodes, the plurality of mobile network nodes and the mobile interfacing node being inter-coupled to form a mobile network, the mobile network being capable of moving from a first location associated with the first interfacing node of the first network to a second location associated with the second interfacing node of the first network, wherein the method comprises the steps of: registering the mobile interfacing node with the first interfacing node of the first network when residing at the first location; registering the mobile interfacing node with the second interfacing node of the first network associated with a second location in response to the first network moving from the first location to the second location; transmitting updating data to a number of the plurality of correspondent nodes indicative of a current topological point of coupling of the mobile interfacing node to the first network; forwarding data bearing a destination address corresponding to a network prefix of the mobile interfacing node to the second interfacing node, the second location corresponding to the current topological point of coupling of the mobile interfacing node to the first network.

Preferably, the method further comprising the steps of: transmitting the updating data to a multicast service, and transmitting the updating data to the number of the plurality of correspondent nodes using subscribing to the multicast service using the multicast service.

Preferably, the updating data comprises a forwarding address for data. More preferably, the forwarding address is a Careof Address.

Preferably, the forwarding address is sent in the form of a Binding Update message.

According to a tenth aspect of the present invention, there is provided a correspondent node apparatus for a first network having a first interfacing node corresponding to a first location and a second interfacing node corresponding to a second location, the apparatus comprising: a processor unit coupled to a storage unit and a transceiver unit for communicating with a mobile network node coupled to a mobile interfacing node, wherein the processor unit comprises a binding unit coupled to the transceiver and arranged to receive updating data for indicating a current topological point of coupling of the mobile interfacing node to the first network, the processor unit being arranged to forward data bearing a destination address corresponding to a network prefix of the mobile interfacing node for onward transmission of the data to the second interfacing node in response to the mobile network moving from the first location to the second location, the second location corresponding to the current topological point of coupling of the mobile interfacing node to the first network.

Preferably, the processor unit further comprises a registration unit coupled to the transceiver unit and arranged to register with a multicast service so as to become a member of a multicast group, and receive the updating data from the multicast service.

Preferably, the updating data comprises a forwarding address for data. More preferably, the forwarding address is a Careof Address.

Preferably, the forwarding address is sent in the form of a Binding Update message.

It is thus possible to provide a communication system providing continuous Internet connectivity to a mobile node whilst being capable of transmitting traffic by an optimal path and minimising signalling overload in the first network. Also, the present invention overcomes the problem of authentication of Binding Updates associated with known proposed solutions to supporting mobile networks. Hence, according to the Mobile-IPv6 protocol, the Correspondent Nodes are thus able to authenticate the BUs transmitted by the mobile router and to send traffic to mobile network nodes using the Careof Address obtained from the BU.

BRIEF DESCRIPTION OF THE DRAWINGS

At least one embodiment of the invention will now be described, by way of example, with reference to the accompanying drawings, in which.

DESCRIPTION OF A PREFERRED EMBODIMENT

Figure 1:
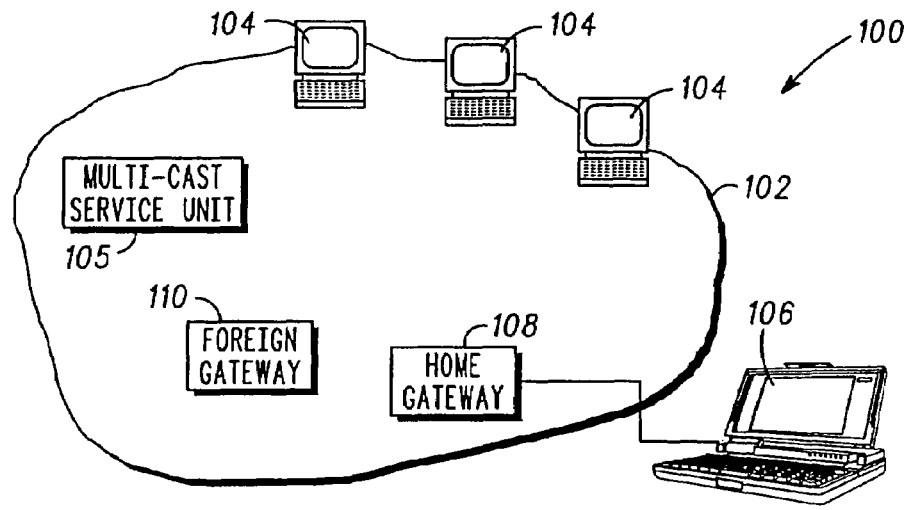
FIG. 1 is a schematic diagram of a communication system constituting a first embodiment of the invention.

The following examples include various steps, which will be described below. The steps of the examples can be performed by hardware components or can be embodied in machine-executable instructions, such as an Operating System, which can be used to cause a general purpose or specific purpose processor or logic circuit, programmed with the instructions, to perform the steps. Alternatively, the steps can be performed by a combination of hardware and software.

Software embodiments of the invention may be implemented in any conventional computer programming language. For example, preferred embodiments can be implemented in a procedural programming language (e.g. "C") or an object oriented programming language (e.g. "C++").

Alternative embodiments of the invention can be implemented as a computer program product for use with a computer system. Such implementation can include a series of computer instructions fixed either on a tangible medium, such as a computer readable media (e.g. a diskette, CD-ROM, ROM, or fixed disk), or fixed in a computer data signal embodied in a carrier wave that is transmittable to a computer system via a modem or other interface device, such as a communications adapter connected to a network over a medium. The medium can be either a tangible medium (e.g. optical or analog communications lines) or a medium implemented with wireless techniques (e.g. microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions can be stored in any memory device, such as semiconductor, magnetic, optical or other memory devices, and can be transmitted using any communications technology, such as optical, infrared, microwave, or other transmission technologies. It is expected that such a computer program product can be distributed as a removable medium with accompanying printed or electronic documentation (e.g. shrink wrapped software), preloaded with a computer system (e.g. on system ROM or fixed disk), or distributed from a server or electronic bulletin board over the network (e.g. the Internet or World Wide Web).

Throughout the description, like parts will be identified by identical reference numerals. The following examples constitute modifications to the Mobile-IPv6 protocol described above.

Referring to FIG. 1, a communication system 100 comprises a first set of interconnected, fixed, packet switched networks 102, for example the Internet, having an IP topology. The fixed set of networks 102 also comprises a plurality of Correspondent Nodes 104 capable of communicating with a Mobile Node (MN) 106 via a home router, for example a Home Gateway (HG) 108, located at a Home Link at a first location and constituting an initial topological point of attachment to the fixed set of networks 102. Each of the plurality of Correspondent Nodes 104 comprise a binding cache for storing relationships between IP addresses.

Figure 7:
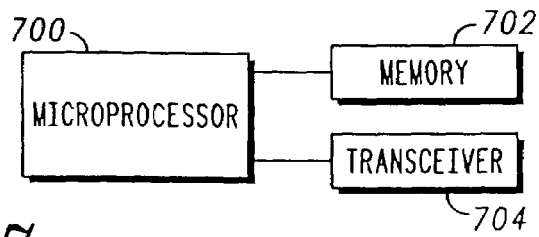
FIG. 7 is a schematic diagram of a router for use in a node in the systems of FIGS. 1 and 4.

The home router (FIG. 7) comprises a processor unit 700 coupled to a data store, for example, a volatile memory 702 and a transceiver unit 704 for receiving data. Similarly, each Correspondent Node 104 and the Mobile Node 106 comprise the functionally similar structural elements as the home router.

The Mobile Node 106 is permanently identified by a Home Address i.e. a Permanent Identifier corresponding to the initial topological point of attachment to the fixed set of networks 102. The fixed set of networks 102 also has a foreign router, for example a Foreign Gateway (FG) 110, located at a second location remote from the first location, and constituting a second topological point of attachment to the fixed set of networks 102. Although, in this example, a single Foreign Gateway has been described, it should be appreciated that the fixed set of networks 102 can comprise more than one Foreign Gateway 110.

The first and/or second topological points of attachment are not limited to the provision of a fixed physical connection or link, and includes any known form of coupling available, for example, a wireless communications link, such as a Radio Frequency (RF) link.

The fixed set of networks 102 comprises a Multi-cast Service Unit 105 to provide, in accordance with the Mobile-IPv6 protocol, an underlying multi-cast mechanism. The Multi-cast Service Unit 105 comprises a Multi-cast Registry entity for allocating multi-cast addresses. Additionally, the Multi-cast Service Unit 105 comprises a Multi-cast Management Unit for managing subscription to a multi-cast group and construction of a multi-cast delivery tree. The multi-cast group comprises a number of the plurality of Correspondent Nodes 104. The fixed set of networks 102 also comprises a Domain Name System (DNS) for recording bindings between domain names, IP addresses and multi-cast addresses.

The Mobile Node 106 comprises most of the existing Mobile-IPv6 protocol mobile node operations. However, the Mobile Node 106 is adapted to obtain the multi-cast address of the multi-cast group and register the multi-cast address with the DNS. Unlike standard mobile nodes operating in accordance with the Mobile-IPv6 protocol, the Mobile Node 106 does not keep a list of the plurality of Correspondent Nodes 104.

Figure 2:
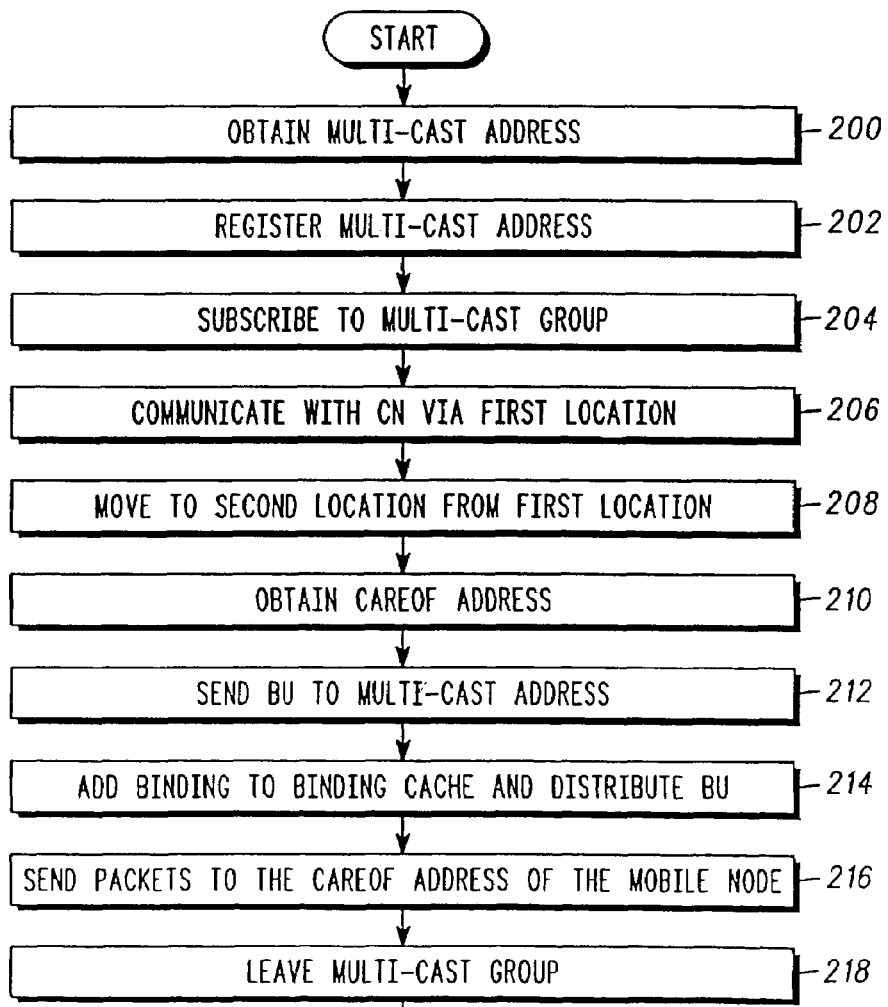
FIG. 2 is a flow diagram of the operation of the system of FIG. 1.

In operation (FIG. 2), the Mobile Node 106 is initially located at the first location and is capable of corresponding with at least one of the plurality of Correspondent Nodes 104, for example, by exchanging data in the form of datagrams.

At set-up of the Mobile Node 106, for example prior to relocation of the Mobile Node 106, the Mobile Node 106 obtains (Step 200) a Multi-cast Address from the Multi-cast Registry entity. The Multi-cast Address is permanently associated with the Mobile Node 106, and registered in the DNS by the Mobile Node 106 (Step 202).

Prior to communication establishment between one of the Correspondent Nodes 104 and the Mobile Node 106, the Correspondent Node 104 calls the DNS for the IP Address corresponding to the Home Address of the Mobile Node 106. The DNS returns the Home Address and the permanent Multi-cast Address of the multi-cast group. The Correspondent Node 104 then subscribes (Step 204) to the multi-cast group using the Multi-cast Address and begins communicating with the Mobile Node 106 (Step 206) at the Home Address.

Upon relocation of the Mobile Node 106 to the second location (Step 208), the Mobile Node 106 interfaces with the Foreign Gateway 110 and obtains (Step 210) a Careof Address from the Foreign Gateway 110. By means of an Update Function, the Mobile Node 106 periodically sends (Step 212) the Careof Address in the form of a Binding Update (BU) message to the Multi-cast Address, and the Multi-cast Service Unit distributes (Step 214) the Binding Update message to the Correspondent Nodes of the Mobile Node 106 in the multi-cast group. Upon receipt of the Binding Update from the Multi-cast Service Unit 105 through the underlying multi-cast mechanism of the IPv6 suite of protocols, each Correspondent Node 104 adds a binding between the IP address of the Mobile Node 106 and the Careof Address contained in the Binding Update message to the binding cache (Step 214). The Correspondent Nodes 104 are then capable of routing (Step 216) datagrams directly to the current topological point of attachment of the Mobile Node 106 by an optimum route. When communications between the Mobile Node 106 and the Correspondent Node 104 terminate, the Correspondent Node 104 leaves (Step 218) the multi-cast group. If necessary, more than one multi-cast group can be formed to communicate the Binding Update messages to the Correspondent Nodes 104.

Figure 3:
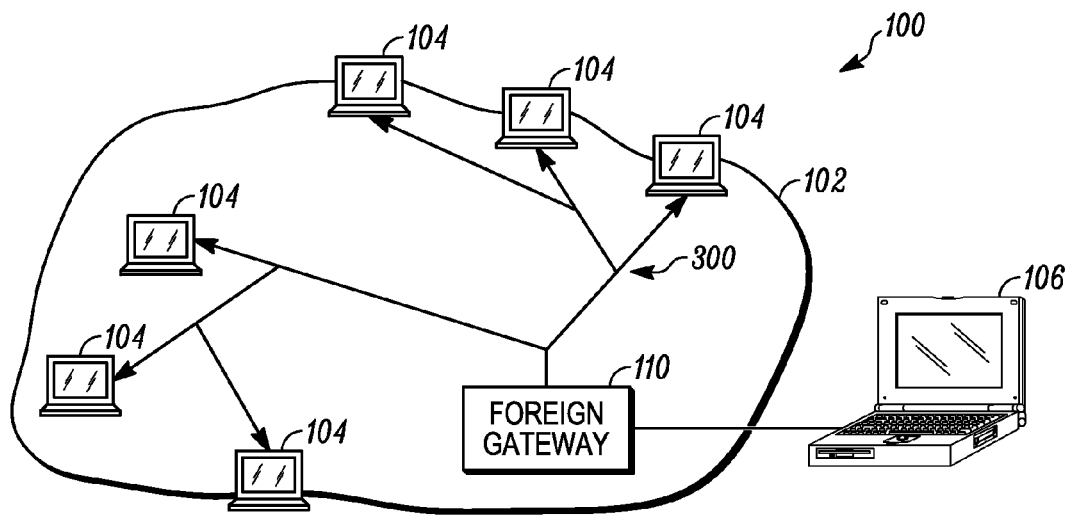
FIG. 3 is a schematic diagram of an updating function employed by the apparatus of FIG. 1.

Referring to FIG. 3, using the Multi-cast Service Unit 105 provided by the set of fixed networks 102, at most one copy of the Binding Update message is sent on each branch of a communication tree 300 linking the Mobile Node 106 and the Correspondent Nodes 104. Hence, multi-cast is a means of minimising bandwidth use by sending only one copy of a message to a particular link, several recipients being reachable by the link. If required, the communication tree 300 can link another node located in the set of fixed networks 102, for example the Home Gateway 108 and the Correspondent Nodes 104. In such an example, the Mobile Node 106 sends the Careof Address to the Home Gateway 108.

Subsequent movement of the Mobile Node 106 to another Foreign Gateway will result in the allocation of a new Careof Address to the Mobile Node 106. Consequently, subsequent Binding Updates are sent by the Mobile Node 106 to the Multi-cast Service Unit 105 to be relayed to subscribers to the multi-cast group.

Figure 4:
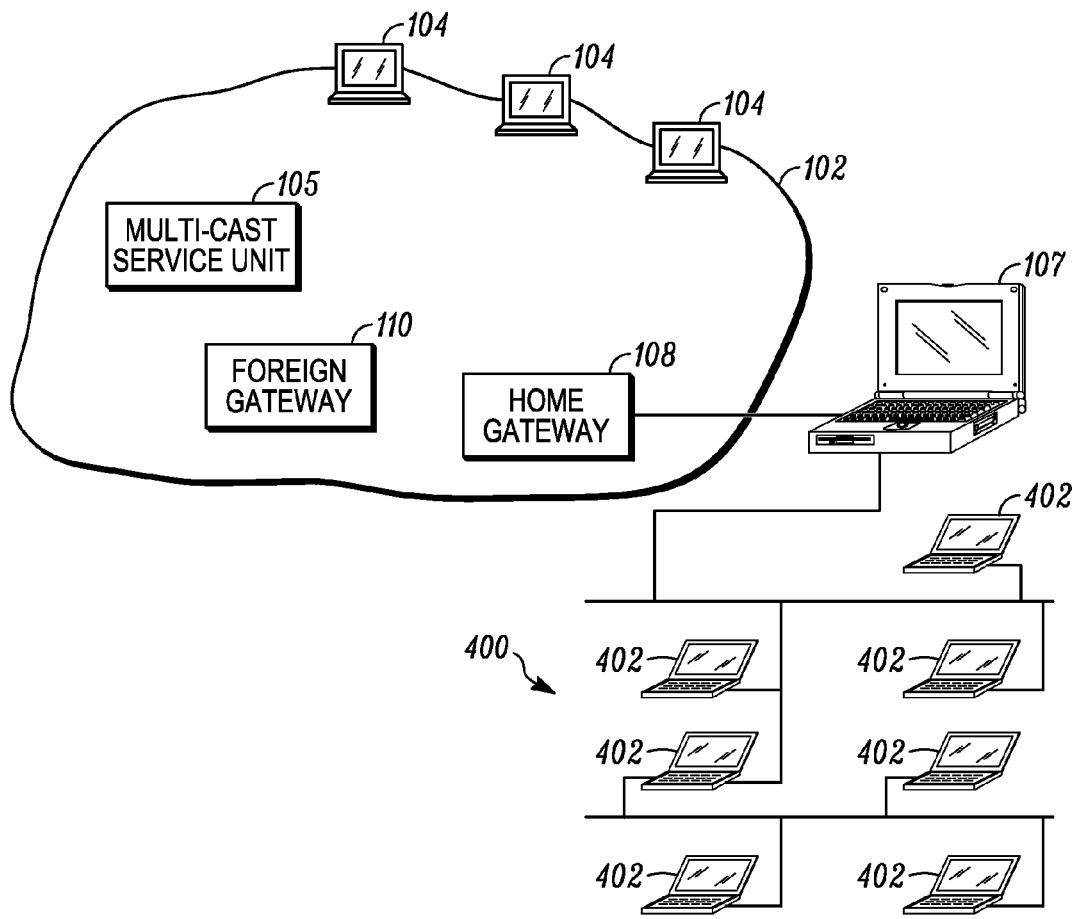
FIG. 4 is a schematic diagram of a second system constituting a second embodiment of the invention.

In a second embodiment of the invention (FIG. 4), the communication system 100 comprises the first set of interconnected, fixed, packet-switched networks 102. The Mobile Node 106 of the communication system 100 is a Mobile Network Gateway (MNG) 107, for example, a border router of a mobile network 400 coupled to a plurality of interconnected Mobile Network Nodes (MNN) 402 sharing the same IP prefix. The MNG 107 is a mobile node specifically enhanced to support mobile networks. The Mobile Network Nodes 402 can be, for example, any mobile node known under the Mobile-IPv6 protocol, such as a host or a router, and are coupled to the MNG 107 for interfacing the mobile network 400 with the fixed set of networks 102 via the Home Gateway 108.

The fixed set of networks 102 also comprises the plurality of Correspondent Nodes 104 capable of communicating with at least one of the plurality of Mobile Network Nodes 402 via the Home Gateway 108. Each Correspondent Node 104 has a binding cache for storing relationships between IP addresses. The Home Gateway 108 is located at the first location and constitutes the initial topological point of attachment (the Home Link) to the fixed set of networks 102. It should be appreciated that the mobile network 400 can comprise hundreds, even thousands, of Mobile Network Nodes 402, each of the Mobile Network Nodes 402 communicating with several Correspondent Nodes 104.

Also, the fixed set of networks 102 comprises the Multi-cast Service Unit 105 to provide, in accordance with the Mobile-IPv6 protocol, the underlying multi-cast mechanism. The Multi-cast Service Unit 105 comprises the Multi-cast Registry entity for allocating the multi-cast addresses. Additionally, the Multi-cast Service Unit 105 comprises a Multi-cast Management Unit for managing subscription to the multi-cast group and construction of the multi-cast delivery tree. Again, the multi-cast group comprises a number of the plurality of Correspondent Nodes 104. The fixed set of networks 102 also comprise the Domain Name system (DNS) for recording bindings between domain names, IP addresses and multi-cast addresses.

The mobile network 400 can be a stub network having an internal architecture which is preserved, i.e. nodes inside the mobile network 400 do not move with respect to the MNG 107 or other mobile network nodes 402. However, it is not essential that the internal architecture is preserved and the nodes inside the mobile network can move with respect to the MNG 107 or other mobile network nodes 402.

The mobile network 400 can be perceived as a single mobile node attached to 'n' interfaces and having one address. The MNG 107 comprises most of the existing Mobile-IPv6 protocol mobile node operations. However, the MNG 107 is adapted to obtain the multi-cast address of the multi-cast group and register the multi-cast address with the DNS. Unlike standard mobile nodes operating in accordance with the Mobile-IPv6 protocol, the MNG 107 does not keep a list of the plurality of Correspondent Nodes 104. Additionally, the MNG 107 is not multi-homed, i.e. the MNG 107 only has one topological point of attachment to the fixed set of networks 102 at a given time.

The MNG 107 is permanently identified by the Home Address, i.e. a Permanent Identifier, corresponding to the initial topological point of attachment to the fixed set of networks 102.

The fixed set of networks 102 also has at least one Foreign Gateway (FG) 110, for example a foreign router located at the second location remote from the first location, and constituting the second topological point of attachment, (the Foreign Link) to the fixed set of networks 102. The Foreign Gateway 110 is used by the mobile network 400 to connect to the fixed set of networks 102 when the mobile network 400 moves to the second location. Hence, it can be seen that the MNG 107 of the mobile network 400 is capable of dynamically changing its point of attachment to the fixed set of networks 102. Consequently the reachability of the mobile network 400 in the IP topology of the fixed set of networks 102 changes as well.

Figure 5:
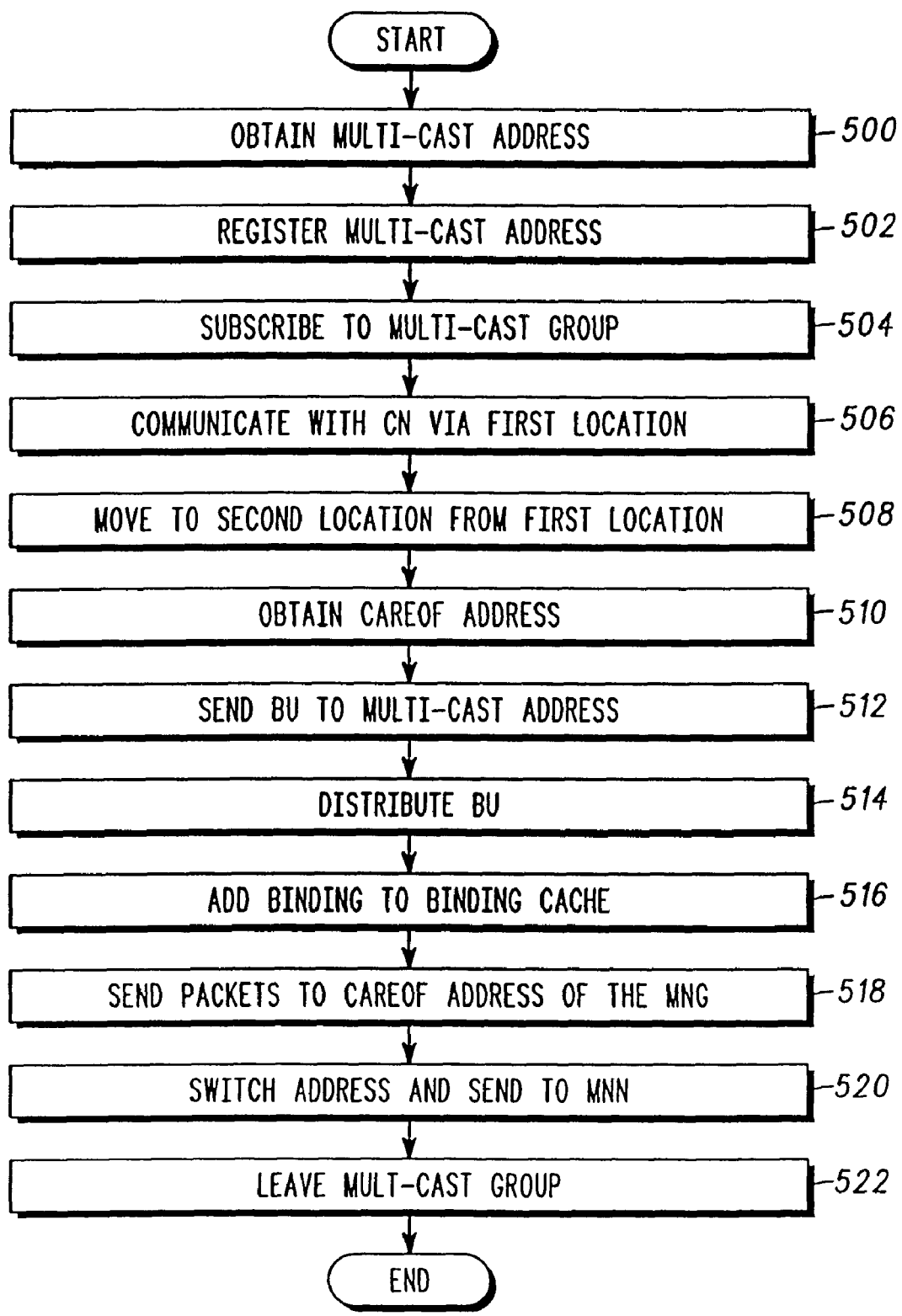
FIG. 5 is a flow diagram of operation of the system of FIG. 4.

In operation (FIG. 5), the mobile network 400 is initially interfaced with the Home Gateway 108 via the MNG 107 at the first location and capable of communicating with at least one of the plurality of Correspondent Nodes 104, for example, by exchanging data in the form of datagrams.

At set-up of the MNG 107 as a mobile router, for example prior to relocation of the mobile network 400, the MNG 107 obtains (Step 500) a Multi-cast Address from the Multi-cast Registry entity and registers (Step 502) the Multi-cast Address in the DNS. The Multi-cast Address is permanently associated with the mobile network 400.

Prior to communication establishment, the Correspondent Node 106 calls the DNS for the IP Address corresponding to the Home Address of the Mobile Node 106. The DNS returns the Home Address and the permanent Multi-cast Address of the multi-cast group. The Correspondent Node 104 then subscribes (Step 504) to the multi-cast group using the Multi-cast Address and begins communicating (Step 506) with at least one of the Mobile Network Nodes 402 via the MNG 107 forming the mobile network 400.

Upon relocation (Step 508) of the mobile network 400 to the second location (Step 202), the mobile network 400 interfaces with the Foreign Gateway 110 and obtains (Step 510) the Careof Address from the Foreign Gateway 110. By means of an Update Function, the MNG 107 periodically sends the Careof Address in the form of a Binding Update message to the Multi-cast Address (Step 512) and the multi-cast service unit distributes (Step 514) the Binding Update message to the Correspondent Nodes 104 of the Mobile Node 106 in the multi-cast group through the underlying multi-cast mechanism of the IPv6 suite of protocols. Upon receipt of the Binding Update message, each of the Correspondent Nodes 104 authenticates a sender of the Binding Update message, i.e. the MNG 107. If the sender is authenticated, the Correspondent Node 104 adds (Step 516) a binding between a network prefix of the MNG 107 and the Careof Address contained in the Binding Update to the binding cache. The network prefix is a set of initial bits in a 128 bit IPv6 address of the Home Address of the MNG 107. If necessary, more than one multi-cast group can be formed to communicate Binding Update messages to the Correspondent Nodes 104.

Each subsequent datagram to be sent by the Correspondent Node 104 to one of the Mobile Network Nodes 402 having a destination IP address matching the network prefix of the MNG 107 in the binding cache is routed (Step 518) to the Careof Address corresponding to the network prefix, i.e. the current point of attachment of the MNG 107, the address of the Mobile Network Node 402 being inserted in the Mobile-IPv6 routing extension header. Datagrams received by the MNG 107 are manipulated by switching the address of the Mobile Network Node 402 contained in the extension header with the Careof Address. The MNG 107 then forwards (step 520) the datagram to one of the Mobile Network Nodes 402 to which the datagram is addressed. Once the communication is over, the Correspondent Node leaves the multi-cast group.

Hence it can be seen that the Binding Updates have a network scope, i.e. the Binding Updates contain the network prefix of the mobile network 400, the network prefix being valid for the entire mobile network 400 instead of a single Mobile Network Node 402. Consequently, Correspondent Nodes 104 receiving Binding Updates use the Careof Address of the MNG 107 when sending datagrams to all destination addresses having the same IP prefix as the network prefix of the mobile network 400, i.e. all mobile network nodes 402.

The Home Gateway 108 can also subscribe to the multi-cast group and can also be arranged to encapsulate and redirect all datagrams to the Careof Address of the MNG 107 where the destination addresses have the same IP prefix as the network prefix of the mobile network 400, i.e. redirecting datagrams of the mobile network 400. The Home Gateway 108 is arranged to forward datagrams to the Careof Address of the MNG 107 in the event that a given Correspondent Node 104 has not subscribed to the multi-cast group, for example, in the case of network partitioning.

Subsequent movement of the MNG 107 to another Foreign Gateway will result in the allocation of a new Careof Address to the MNG 107. Consequently, subsequent Binding Updates sent by the MNG 107 to the Multi-cast Service Unit reaches subscribers to the multi-cast group.

Figure 6:
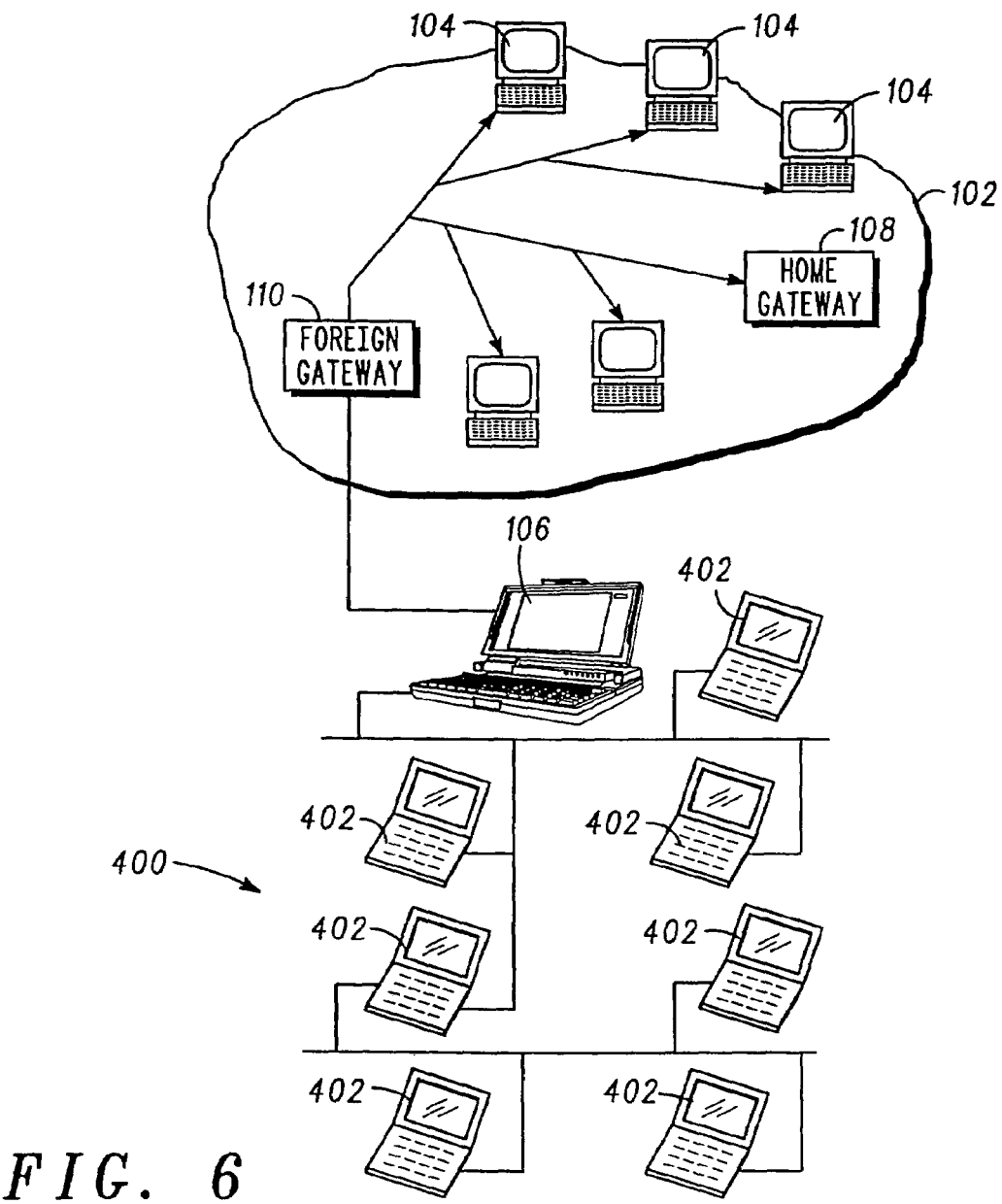
FIG. 6 is a schematic diagram of an updating function employed by the apparatus of FIG. 4.

Referring to FIG. 6, using the Multi-cast Service Unit 105 provided by the set of fixed networks 102, a single copy of the Binding Update message can be sent on each branch of a communication tree 300 linking the MNG 107 and the Correspondent Nodes 104. Hence, multi-cast is a means of minimising bandwidth use by sending one copy of a message to a particular link, several recipients being reachable by the link. Upon receipt of the Binding Update from the multi-cast service, each Correspondent Node 104 extracts the Careof Address of the MNG 107 and is then capable of sending datagrams directly to the Mobile Network Node 402 by an optimum route. If required, the communication tree 300 can link another node located in the net of fixed networks 102, for example the Home Gateway 108 to the Correspondent Nodes 104. In such an example, the MNG 107 sends the Careof Address to the Home Gateway 108.

In a third embodiment of the invention, the above described examples can exclude the use of the multi-cast service to send the Binding Update messages to the Mobile Node 106/MNG 107.

Although the above examples have been described in connection with the fixed set of networks 102 operating in accordance with the Ipv6 protocol, it should be appreciated that the fixed set of networks 106 need not necessarily be fixed and can operate in accordance with any functionally equivalent protocol. Rather, the first network 102 only needs to be mobile relative to the second network 106. Additionally, although a set of networks have been described above, a single network can be used instead of the fixed set of networks 102. Also, the use of the Mobile-Ipv6 protocol should be understood to include the use of any other functionally equivalent protocol.

The invention claimed is:

1. A communications system comprising:
a mobile node capable of mobility relative to a first network having a plurality of correspondent nodes, a first interfacing node and a second interfacing node, the plurality of correspondent nodes being capable of sending data to the mobile node via the first interfacing node, the mobile node being capable of moving from a first location associated with the first interfacing node of the first network to a second location associated with the second interfacing node of the first network, wherein
the system uses multicast routing of data when the mobile node moves from the first location to the second location, the mobile node generates binding update information and delivers the binding update information to a multicast address, the binding update information comprises a forwarding address for the mobile node, the forwarding address having been provided to the mobile node by the second interfacing node and the system includes a multicast service unit which delivers the binding update information by multicast routing to correspondent nodes which have joined the multicast group indicated by the multicast address.

2. A system as claimed in claim 1, the mobile node is a mobile network gateway coupled to a plurality of mobile network nodes and is operable to forward datagrams addressed to one of the mobile network nodes by switching an address of the mobile node contained in the datagram to a care of address for the mobile network node.

3. A system as claimed in claim 1, wherein the system establishes for the mobile node at least one multi-cast group comprising a plurality of the correspondent nodes, by obtaining a multi-cast address for the group from a multi-cast registry entity.

4. A system as claimed in claim 3, wherein the first interfacing node is also a member of the multi-cast group and, when the mobile node is a mobile network gateway, is operable, in response to receiving updating data relating to the mobile network gateway, to redirect data destined for any one of the mobile network nodes to the second interfacing node.

5. A system as claimed in claim 1, wherein the correspondent nodes of the multi-cast group upon receiving a binding update, optionally after authenticating a sender of the update, add a binding between the update information and an address for the mobile node held in a binding cache.

6. A system as claimed in claim 5, wherein the correspondent nodes of the multi-cast group upon receiving a binding update, add a binding between the update information and an address for the mobile node held in a binding cache after authenticating a sender of the update.

7. A system as claimed in claim 6, wherein the system enables a correspondent node to leave the multi-cast group after-it has communicated with the mobile node.

8. A system as claimed in claim 7, further comprising a domain name server register the multi-cast address as associated with the mobile node and to provide the multi-cast address to a correspondent node requesting a home address of the mobile node.

9. A system according to claim 8 wherein the correspondent node receiving the multi-cast address from the domain name server subscribes to the multi-cast group using the multi-cast address.

10. A method of operating a communications system comprising a mobile node capable of mobility relative to a first network and having a plurality of correspondent nodes capable of sending data to the mobile node, comprising the steps of:

moving the mobile node from a first location associated with a first interfacing node of the first network to a second location associated with a second interfacing node of the first network;

receiving, at the mobile node in response to moving, a forwarding address from the second interfacing node, the forwarding address for the mobile node and multicast routing of data used in the system; and generating, by the mobile node, a binding update information;

delivering, by the mobile node, to a multicast address the binding update information, the binding update information comprises the forwarding address for the mobile node, the forwarding address having been provided to the mobile node by the second interfacing node; and delivering, by a multicast service unit of the system, the binding update information by multicast routing to correspondent nodes which have joined the multicast group indicated by the multicast address.

* * * * *